US012208992B1

(12) United States Patent
Guilani et al.

(10) Patent No.: US 12,208,992 B1
(45) Date of Patent: Jan. 28, 2025

(54) ELEVATOR SUSPENSION MEMBER WITH COATING

(71) Applicant: OTIS ELEVATOR COMPANY, Farmington, CT (US)

(72) Inventors: Bardia Guilani, Woodstock Valley, CT (US); George Shaw, Norwich, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/382,593

(22) Filed: Oct. 23, 2023

(51) Int. Cl.
*B66B 7/06* (2006.01)
*B66B 11/00* (2006.01)

(52) U.S. Cl.
CPC .......... *B66B 7/062* (2013.01); *B66B 11/0005* (2013.01)

(58) Field of Classification Search
CPC ....... B66B 7/062; B66B 7/06; B66B 11/0005; D07B 2501/2007; D07B 1/22
See application file for complete search history.

(56) References Cited

U.S. PATENT DOCUMENTS 5,566,786 A * 10/1996 De Angelis ............ D07B 1/162 187/266
10,913,634 B2 * 2/2021 Eastman ................ D07B 5/006
11,001,474 B2 * 5/2021 Gurvich ................... D07B 1/16
2011/0089130 A1 * 4/2011 Stephan ..................... B66C 1/12 212/262
2013/0037353 A1 * 2/2013 Phillips ................... B66B 7/062 428/377
2015/0017436 A1 * 1/2015 Krishnan ................ C23C 22/03 428/394
2016/0304321 A1 10/2016 Guiliana et al.
2019/0218061 A1 * 7/2019 Eastman ................ D07B 5/006
2020/0122971 A1 * 4/2020 Hida ......................... D07B 1/16
2021/0229956 A1 * 7/2021 Dudde ...................... D07B 1/22

FOREIGN PATENT DOCUMENTS

ES 2305343 T3 * 11/2008 ............... D07B 1/16
JP 2015048178 A * 3/2015 ............. D07B 1/025
KR 20100008668 U * 9/2010 ......... B66B 11/0005
KR 20200044359 A * 4/2020 ............. B66B 7/062

OTHER PUBLICATIONS

Machine translation of the description of KR 20200044359 A (Year: 2020).*

* cited by examiner

*Primary Examiner* — Michael R Mansen
*Assistant Examiner* — Michelle M Mudwilder
(74) *Attorney, Agent, or Firm* — Carlson, Gaskey & Olds, P.C.

(57) ABSTRACT

A method and assembly includes at least one suspension member that supports an elevator car and facilitates movement of the elevator car within a hoistway. A jacket encases the at least one suspension member. A coating at least partially covers the jacket, and the coating includes at least one light resistant property.

18 Claims, 2 Drawing Sheets

ELEVATOR SUSPENSION MEMBER WITH COATING

BACKGROUND

Elevator systems are in widespread use for carrying passengers between various levels in buildings. Some elevator systems are traction-based in which a suspension assembly, sometimes referred to as roping, suspends the elevator car and a counterweight. The suspension assembly also facilitates movement of the elevator car when needed. Traditional suspension assemblies include round steel ropes; however, elevator systems have also included other types of suspension members, such as flat belts or other types of ropes that have tension members encased in a compressible polymer jacket. Such suspension members are often utilized in glass hoistways, which expose the suspension members to external lighting conditions. These conditions may affect the suspension members over prolonged exposure.

SUMMARY

An illustrative example assembly includes: at least one suspension member that supports an elevator car and facilitates movement of the elevator car within a hoistway; a jacket that encases the at least one suspension member; and a coating that at least partially covers the jacket, wherein the coating including at least one light resistant property.

In addition to one or more of the features described above, or as an alternative, the at least one light resistant property comprises ultraviolet resistance.

In addition to one or more of the features described above, or as an alternative, the coating is an entirely solids-based or water-based formulation.

In addition to one or more of the features described above, or as an alternative, the coating includes a low-friction additive.

In addition to one or more of the features described above, or as an alternative, the low-friction additive comprises a fluorocarbon compound.

In addition to one or more of the features described above, or as an alternative, the at least one suspension member comprises a plurality of tension members encased within the jacket, and wherein the jacket comprises a compressible material.

In addition to one or more of the features described above, or as an alternative, the jacket has an external facing side and a traction side that is supported on at least one sheave, and wherein the coating only covers the external facing side.

In addition to one or more of the features described above, or as an alternative, the hoistway includes one or more walls that are formed from translucent material or transparent material.

An illustrative example elevator system includes: an elevator car; at least one suspension member that supports the elevator car and facilitates movement of the elevator car within a hoistway, wherein the at least one suspension member comprises a plurality of tension members encased within a jacket; and a coating that at least partially covers the jacket, wherein the coating comprises an ultraviolent protection coating.

In addition to one or more of the features described above, or as an alternative, the coating includes a low-friction additive.

In addition to one or more of the features described above, or as an alternative, the jacket comprises a compressible material.

In addition to one or more of the features described above, or as an alternative, the jacket has an external facing side and a traction side that is supported on at least one sheave, and wherein the coating only covers the external facing side.

In addition to one or more of the features described above, or as an alternative, the hoistway includes one or more walls that are formed from translucent material or transparent material.

An illustrative example method of coating a suspension member that supports an elevator car and facilitates movement of the elevator car within a hoistway, comprises: encasing a plurality of tension members within a jacket to form at least one suspension member; and applying a coating to at least partially cover a portion of the jacket, wherein the coating includes at least one light resistant property.

In addition to one or more of the features described above, or as an alternative, the at least one light resistant property comprises ultraviolet resistance.

In addition to one or more of the features described above, or as an alternative, the method includes adding a low-friction additive to the coating.

In addition to one or more of the features described above, or as an alternative, the method includes applying the coating to only cover a side of the jacket that faces an external light source, leaving a traction side of the jacket uncoated.

In addition to one or more of the features described above, or as an alternative, the method includes, subsequent to application of the coating, immediately curing the coating with a UV light source.

In addition to one or more of the features described above, or as an alternative, applying the coating comprises: brushing, rolling, or spraying the coating on the jacket.

In addition to one or more of the features described above, or as an alternative, the method includes forming at least one wall of the hoistway from a translucent or transparent material.

The various features and advantages of an example embodiment will become apparent to those skilled in the art from the following detailed description. The drawings that accompany the detailed description can be briefly described as follows.

DETAILED DESCRIPTION

Embodiments of this disclosure provide an elevator suspension member that is coated with a ultraviolet (UV) protection coating to enhance UV resistance and minimize jacket degradation due to UV damage.

Figure 1:
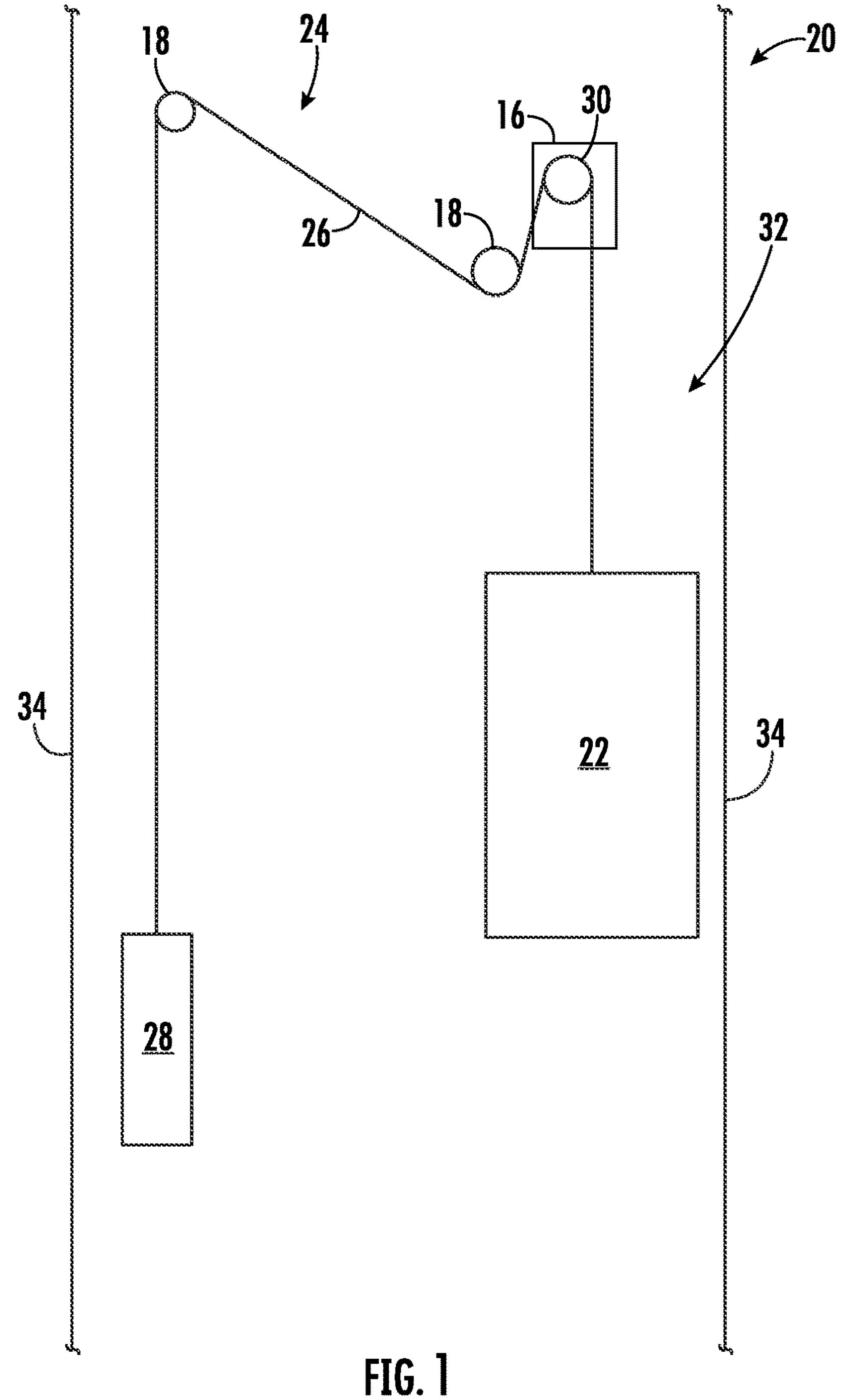
FIG. 1 schematically illustrates selected portions of an elevator system.

FIG. 1 schematically illustrates selected portions of an elevator system 20. An elevator car 22 is supported by a roping arrangement or suspension assembly 24 that includes a plurality of suspension members 26. In one example, the elevator system 20 is a traction-based system in which a controller controls operation of a machine 16 to cause selected movement of the elevator car 22. The elevator car 22 is coupled to a counterweight 28 by the suspension members 26. The suspension members 26 are driven by the machine 16 around a traction sheave 30, as well as any additional deflector sheaves 18, as the elevator car 22 moves within a hoistway 32 between landings or levels.

The hoistway 32 may be situated in a variety of locations within a building, depending on the building configuration. In some instances, at least part of the hoistway 32 may be along an exterior surface of the building. In one example, the hoistway 32 is comprised of one or more walls 34 that are formed from a translucent or transparent material through which external light can pass. For example, the hoistway walls 34 can be made of a plastic based material or a glass material.

Figure 2:
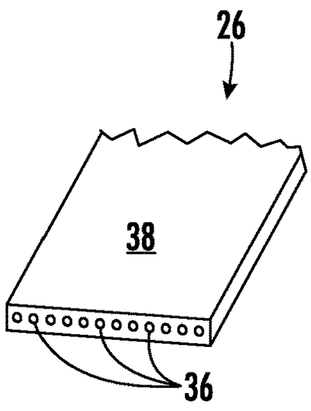
FIG. 2 schematically illustrates a portion of an example suspension member.

FIG. 2 schematically illustrates a portion of an example suspension member 26. In the illustrated embodiment, the suspension member 26 is a flat belt including a plurality of tension members 36 encased in a jacket 38 of a compressible material, such as polyurethane or other similar materials for example. In many embodiments, the tension members 36 comprise steel cords, and the suspension member 26 is referred to as a coated steel belt (CSB), for example. Other embodiments include tension members that are made of different materials and jacket surfaces that are not flat, such as those that incorporate ribs, grooves, or similar features.

Figure 3:
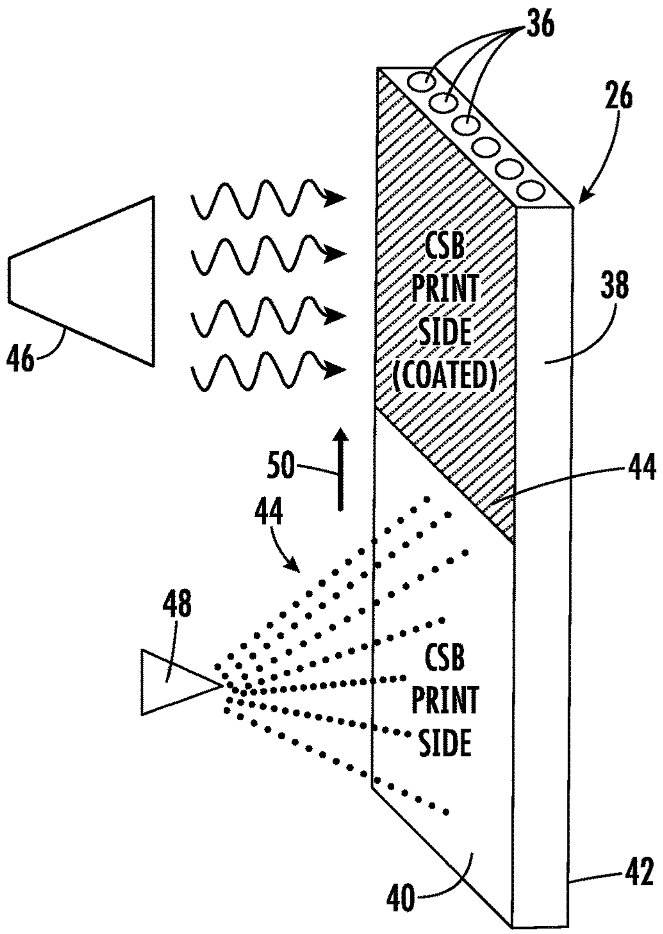
FIG. 3 schematically illustrates one example of a suspension member with a coating.

When the suspension members 26 are utilized in glass hoistways 32 that do not include UV-blocking glass or film, degradation of the members 26 can occur due to prolonged exposure to sunlight. As shown in FIG. 3, the jacket 38 has an external facing side 40, e.g. a print side, and a traction side 42, e.g. internal facing side, that is supported on the traction sheave 30. The subject disclosure provides a coating 44, which includes at least one light resistant property, that at least partially covers the jacket 38. In one example, at least one light resistant property comprises UV resistance. Any type of coating with UV resistance can be applied to the jacket 38. Those skilled in the art who have the benefit of this description will be able to determine which UV resistant coating to use for each elevator application. This type of coating 44 is particularly beneficial for specific installations, such as sightseeing elevators, which require enhanced UV-protection of the members 26 without altering construction of the glass.

In one example, the coating 44 only covers the external facing side 40. As the external facing side 40 is the only side that faces external lighting, coating on the traction side 42 would not be needed, thus saving cost.

In one example, the coating 44 is an entirely, e.g. 100%, solids-based or water-based formulation. As such, the coating 44 does not include or require any type of flammable solvent.

In one example, the coating 44 includes a low-friction additive. The low-friction additive can comprise a fluorocarbon compound such as polyvinylidene fluoride (PVDF) or other similar materials, for example. The PVDF additive is particularly beneficial due to its inherent UV-resistance and low wear/friction properties. The use of a low-friction additive reduces friction and wear of the coating 44 over time. The use of a low-friction additive also prevents stick-slip of the suspension member 26 that may cause noise arising from interaction with various sheaves installed in the elevator system.

Figure 4:
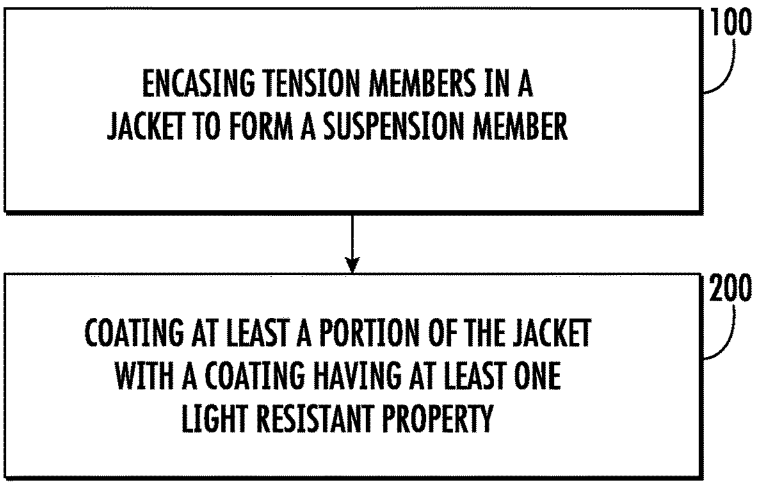
FIG. 4 is a flowchart diagram of an example method of coating a suspension member.

FIG. 4 shows a flowchart diagram of an example method of coating a suspension member 26. In one example, the method includes a step of encasing a plurality of tension members 36 within a jacket 38 to form at least one suspension member 26, as indicated at 100. The method further includes a step of applying a coating 44 to at least partially cover a portion of the jacket 38, as indicated at 200, wherein the coating 44 includes at least one light resistant property.

The method may include any of the following steps either alone or in any combination. In one example, the at least one light resistant property comprises UV resistance.

In one example, the method includes adding a low-friction additive to the coating 44.

In one example, the method includes applying the coating 44 to only cover a side 40 of the jacket 38 that faces an external light source, leaving a traction side 42 of the jacket 38 uncoated.

In one example, the method includes, subsequent to application of the coating 44, immediately curing the coating 44 with an ultraviolet light source 46.

In one example, the coating 44 is applied with an applicator 48. The applicator 38 comprises applying the coating 44 by brushing, rolling, or spraying the coating 44 on the jacket 38.

In one example, the method includes forming at least one wall 34 of the hoistway 32 from a translucent or transparent material.

The subject disclosure utilizes a coating 44 on a print side 40 of the suspension members 26, which includes UV-protection to enhance UV-resistance and reduce likelihood of jacket degradation. The applied coating 44 avoids the use of flammable solvents, and incorporates low-friction additives to reduce friction and wear of the cured coating, as well as reducing noise.

The coating 44 may be applied in the field at the specific jobsite that requires UV-protection of the suspension members 26; however, the coating 44 may also be applied prior to installation in the field, for example after extrusion of the suspension members 26 at a manufacturing facility. The coating application process includes the steps of applying the coating via a spray, brush, or roll-on process/applicator, followed by a rapid cure using a UV light source 46, heat source, or combination thereof. For example, as shown in FIG. 3, the applicator 38 applies the coating 44 onto the jacket (lower portion of jacket 38), and then the suspension member 26 is moved away from the applicator 38 (see arrow 50) to the UV-curing light source 46, heat source, or combination thereof that is applied for a predetermined amount of time to accelerate the cure of the coating 44. The UV-and/or-heat-assisted rapid cure is intended to minimize downtime and allow for application in the field.

Finally, as the coating 44 is only applied to the print side 40, it will not alter the traction characteristics necessary for suspension member function. Furthermore, by focusing on selective application of the coating onsite, the need and cost associated with altering the formulation of all suspension members is avoided.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An assembly comprising:

at least one suspension member that supports an elevator car and facilitates movement of the elevator car within a hoistway;

a jacket that encases the at least one suspension member, and wherein the jacket has an external facing side and a traction side that is supported on at least one sheave; and a coating that at least partially covers the jacket, the coating including at least one light resistant property, and wherein the coating only covers the external facing side of the jacket.

2. The assembly of claim 1, wherein the at least one light resistant property comprises ultraviolet resistance.

3. The assembly of claim 1, wherein the coating includes a low-friction additive.

4. The assembly of claim 3, wherein the low-friction additive comprises a fluorocarbon compound.

5. The assembly of claim 1, wherein the at least one suspension member comprises a plurality of tension members encased within the jacket, and wherein the jacket comprises a compressible material.

6. The assembly of claim 1, wherein the hoistway includes one or more walls that are formed from translucent material or transparent material.

7. An elevator system, comprising:

an elevator car;

at least one suspension member that supports the elevator car and facilitates movement of the elevator car within a hoistway, wherein the at least one suspension member comprises a plurality of tension members encased within a jacket, and wherein the jacket has an external facing side and a traction side that is supported on at least one sheave; and a coating that at least partially covers the jacket, wherein the coating comprises an ultraviolent protection coating, and wherein the coating only covers the external facing side of the jacket.

8. The elevator system of claim 7, wherein the coating includes a low-friction additive.

9. The elevator system of claim 7, wherein the jacket comprises a compressible material.

10. The elevator system of claim 7, wherein the hoistway includes one or more walls that are formed from translucent material or transparent material.

11. A method of coating a suspension member that supports an elevator car and facilitates movement of the elevator car within a hoistway, the method comprising:

encasing a plurality of tension members within a jacket to form at least one suspension member; and applying a coating to at least partially cover a portion of the jacket, wherein the coating includes at least one light resistant property, and further including applying the coating to only cover a side of the jacket that faces an external light source, leaving a traction side of the jacket uncoated.

12. The method of claim 11, wherein the at least one light resistant property comprises ultraviolet resistance.

13. The method of claim 11, including adding a low-friction additive to the coating.

14. The method of claim 11, including: subsequent to application of the coating, immediately curing the coating with a UV light source.

15. The method of claim 14, wherein applying the coating comprises:

brushing, rolling, or spraying the coating on the jacket.

16. The method of claim 15, including applying the coating to a portion of the jacket with an applicator to form a coated portion, moving the coated portion of the at least one suspension member away from the applicator and to the UV light source, and curing the coated portion for a predetermined amount of time.

17. The method of claim 11, including forming at least one wall of the hoistway from a translucent or transparent material.

18. The method of claim 11, including applying the coating on a jobsite location.

* * * * *